United States Patent [19]

Hanson

[11] 4,203,730

[45] May 20, 1980

[54] POLYAMINE DERIVATIVES OF OXIDIZED OLEFINIC SUBSTITUTED DICARBOXYLIC ACID COMPOUNDS

[75] Inventor: Joseph B. Hanson, Wheaton, Ill.

[73] Assignee: Standard Oil Company of Indiana, Chicago, Ill.

[21] Appl. No.: 942,296

[22] Filed: Sep. 14, 1978

[51] Int. Cl.$^2$ .............................................. C10L 1/22
[52] U.S. Cl. ............................... 44/71; 260/326.26; 544/372; 44/63; 252/51.5 A; 252/55
[58] Field of Search ............... 44/63, 71; 252/51.5 A, 252/55; 260/326.26; 544/372

[56] References Cited

U.S. PATENT DOCUMENTS

| | | | |
|---|---|---|---|
| 3,316,177 | 8/1967 | Dorer | 252/51.5 A |
| 3,927,041 | 12/1975 | Cengel et al. | 44/71 |
| 4,048,080 | 9/1977 | Lee et al. | 252/51.5 A |
| 4,086,173 | 4/1978 | Nnadi | 252/51.5 A |
| 4,098,585 | 6/1978 | Vartanian et al. | 252/51.5 A |
| 4,121,026 | 10/1978 | Cheng et al. | 44/71 |
| 4,128,403 | 12/1978 | Honnen | 44/71 |

*Primary Examiner*—Winston A. Douglas
*Assistant Examiner*—J. V. Howard
*Attorney, Agent, or Firm*—Mark DiPietro; William T. McClain; William H. Magidson

[57] ABSTRACT

A polyamine derivative of an oxidized substantially undegraded olefinic substituted dicarboxylic acid compound and gasoline compositions containing an effective amount of the reaction product.

16 Claims, No Drawings

POLYAMINE DERIVATIVES OF OXIDIZED OLEFINIC SUBSTITUTED DICARBOXYLIC ACID COMPOUNDS

This invention relates to additives for hydrocarbons. More particularly, this invention relates to a novel polyamine derivative of an oxidized substantially undegraded olefinic substituted dicarboxylic acid compound. The invention also relates to gasoline containing the polyamine derivative of oxidized olefinic substituted dicarboxylic acid compounds.

Additives which improve engine performance and fuel economy by preventing deposit formation on carburetor surfaces have attracted increasing attention in recent years. While the polyamine derivatives of alkenyl succinic acid compounds and the like prevent some deposit formation in carburetors and engines, harmful deposits yet result from the severe conditions in modern engines caused partly by anti-pollution modifications.

U.S. Pat. No. 3,316,177 to Dorer, discloses the polyamine salt of the reaction product of maleic anhydride and an oxidized degraded interpolymer of ethylene and propylene as a sludge inhibitor in hydrocarbon fluids found in refinery units. These compounds suffer the drawback that (1) the polymer is degraded during oxidation, (2) the oxidation occurs prior to the reaction of the polyolefin with the maleic anhydride and (3) a polyamine salt is used. These characteristics reduce the utility of these compounds as gasoline-carburetor deposit inhibiting agents. The degraded polyolefin will contain a variety of functional groups which will cause the degraded polyolefin to react in various ways with the maleic anhydride thus severly reducing control over the nature of the polyolefin maleic anhydride reaction product. Polyamine salts can cause undesirable emulsions in gasoline.

U.S. Pat. No. 2,806,860 to Phillips et al discloses corrosion inhibitors suitable for synthetic lubricants comprising epoxy alkyl succinic anhydrides which are prepared by the reaction of alkenyl succinic anhydrides with percarboxylic acids. These derivatives do not provide carburetor detergency.

U.S. Pat. No. 4,098,585 to Vartanian et al discloses a gasoline additive produced by the reaction of an alkenyl succinic anhydride, an amine and a free radical initiator such as a peroxy compound. As disclosed in the specification the reaction occurs in such a manner that the olefinic bond is not oxidized and the free radical initiator promotes the reaction between the amine and the olefinic bond in the alkenyl substituent in order to incorporate large amounts of amine. In the operating examples less than 0.2 moles of peroxy compound is used in the reaction between the alkenyl succinic acid and the amine, and the nitrogen concentration in the product indicates more than one mole of amine compound reacts per mole of alkenyl succinic acid. No indication is given of any oxidation occurring in the reaction. The amounts of peroxy compound present produce only initiator-free radicals in the reaction mixture with substantially no oxidation.

Although hydrocarbons are commonly provided with oxygen-containing functional groups by catalytic and noncatalytic oxidations performed with many oxidizing agents, polyamine derivatives of oxidized olefinic substituted dicarboxylic acid compounds are to the best of my knowledge unknown.

The primary object of this invention is to provide a new class of highly active gasoline detergents. Another object of the invention is to provide a new gasoline detergent additive which provides excellent carburetor and engine cleanliness at a low treatment level of the additive. Another object of the invention is to provide a gasoline composition which during operation of the gasoline engine leaves minimal deposits on carburetor and valve surfaces. Other objects of the invention appear hereinafter.

One aspect of this invention is a composition comprising the reaction product of a polyamine and an oxidized substantially undegraded olefinic substituted dicarboxylic acid compound. A second aspect of this invention is a gasoline containing the composition.

We have now found that a new class of gasoline additives can be made by reacting a polyamine with an oxidized substantially undegraded olefinic substituted dicarboxylic acid compound. The oxidation of the olefinic substituted dicarboxylic acid compound is believed to introduce oxygen containing polar functional groups into the olefinic substituent by the reaction of at least one olefinic bond with an oxidizing agent without causing substantial degradation of the olefin substituent. These oxygen containing groups apparently add polarity and appear to cause the improved detergency of the polyamine derivative of the oxidized dicarboxylic acid compound.

Briefly, the compounds of this invention are produced by reacting polyamine with olefinic substituted dicarboxylic acid compounds which are reacted with an oxidizing agent.

Oxidizing agents which can be used to oxidize the unsaturated substituted dicarboxylic acid compound are conventional oxidizing agents. Any oxygen containing material capable of releasing oxygen atoms or molecules under oxidizing conditions can be used. Examples of oxidizing agents which can be used under suitable conditions of temperature, concentration and pressure include oxygen, air, sulfur oxides such as sulfur dioxide, sulfur trioxide, etc., nitrogen oxides including nitrogen dioxide, nitrogen trioxide, nitrogen pentoxide, etc., peroxides such as hydrogen peroxide, sodium peroxide, percarboxylic acids and ozone. Other suitable oxidizing agents are the oxygen-containing gases such as various mixtures of oxygen, air, inert gases such as carbon dioxide, noble gases, nitrogen, natural gas, etc. Air, air with added oxygen or diluted air with reduced oxygen concentration containing less than the naturally occurring amount of oxygen are the preferred agents for reasons of economy, availability, and safety.

The olefinic substituted dicarboxylic acid compounds can be prepared by the reaction of an olefinic compound and an unsaturated dicarboxylic acid compound. The unsaturated dicarboxylic acid compounds are compounds containing from about 4 to about 10 carbon atoms containing two carboxyl functions either free or in an anhydride form and at least one unsaturated olefinic bond. Examples of such unsaturated dicarboxylic acid compounds are maleic anhydride, maleic acid, fumaric acid, itaconic acid and itaconic anhydride, citraconic acid and citraconic anhydride, pent-2-enedioic acid, pent-2-enedioic anhydride etc. Maleic anhydride, maleic acid, and fumaric acid are preferred for reasons of high reactivity and low cost.

Olefinic compounds used to prepare the olefinic substituted dicarboxylic acid compound are substantially hydrocarbon compounds containing from about 20 to about 400 carbon atoms containing 1 to 4 olefinic bonds. The olefinic compound can contain other functional groups such as hydroxyls, carbonyls, carboxyl groups, halide groups, alkyl and aryl substituents, nitrogen containing groups, boron containing groups, organometallic groups, sulfur containing groups, etc. The important characteristics of the olefinic hydrocarbon is that at least one olefinic group is present for reaction with the unsaturated dicarboxylic acid and that the olefinic hydrocarbon is a substantially hydrocarbon composition which renders the final compound soluble in gasoline. Commonly dicarboxylic acid derivatives of olefinic compounds having less than 20 carbons are not sufficiently soluble in gasoline. Preferably, for reasons of availability, low cost, and high reactivity, viscous polyalkane polymers of olefinically unsaturated monomers are preferred. These polymers can contain up to 400 carbon atoms and are prepared from alkene (olefin) monomers such as ethene, propene, 1-butene, cis- and trans-2-butene, and isobutylene etc. Other olefinic type monomers can be used in the polyalkene polymer. The viscous polyalkene polymers are commonly produced by polymerization of an alkene stream under pressure in contact with an aluminum chloride catalyst. The preferred polyalkenes for reasons of high activity and low cost are polypropylenes and polybutenes such as polyisobutylene having a molecular weight between about 200 and about 6000, preferably for ease of reaction and activity of the additive a polybutene, molecular weight of about 200 to 3000, is used.

The preferred olefinic substituted dicarboxylic acid for reasons of economy and ease of oxidation is a polyalkenyl succinic acid or anhydride having a molecular weight from about 250 to 6000, selected from the group consisting of polyisobutenyl succinic anhydride, polybutenyl succinic anhydride and polypropenyl succinic anhydride.

Polyamines containing at least two nitrogen atoms of which one nitrogen atom is bonded to at least one hydrogen atom produce the gasoline detergents having significant detergency properties. The polyamines useful in this invention are polyalkylene polyamines of the general formula

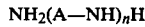

NH$_2$(A—NH)$_n$H wherein A is an alkylene group having from 2 to 6 carbon atoms, n is a number from 1 to 6. Examples of suitable polyalkylene polyamines are ethylene diamine, hexamethylene diamine, diethylene triamine, triethylene tetramine, tetraethylene pentamine, and tripropylene tetramine. Other polyamines which are useful in this invention are the "Duomeens" having the formula R—NH(CH$_2$)$_3$NH$_2$ wherein R is a hydrocarbyl group having from about 2 to 25 carbon atoms. Still other useful polyamines are bis(aminopropyl)-ethylene diamine, bis(aminopropyl)-piperazine, and bis(aminopropyl)-methylamine.

In somewhat greater detail, the olefinic substituted dicarboxylic acid compounds can be produced by the reaction between an olefinic compound and an unsaturated dicarboxylic acid compound by conventional techniques, in which the unsaturated dicarboxylic acid compound and the olefinic compound react neat, in an inert solvent or in an excess of olefinic compound as a process solvent at reduced, ambient, or elevated pressures at a temperature from about 160° C. to about 300° C. for a period of time from about 1 hour to about 24 hours. Conventional catalysis can be used.

The oxidation of the olefinic substituted dicarboxylic acid compound is performed by reacting the olefinic substituted dicarboxylic acid compound from about 0.1 to 10.0 moles and greater of the oxidizing agent per mole of the olefinic substituted carboxylic acid compound. The reaction can be conducted neat or in the solvent used in the reaction between the olefin compound and the unsaturated dicarboxylic acid compound. The mixture can be heated to an elevated temperature of about 50° C. to 800° C. for a period of time of about 1 to 48 hours depending on the oxidizing agent used. To avoid substantial degradation strong oxidizing agents such as ozone, sulfur trioxide, peroxides, etc. require less strenuous oxidizing conditions and smaller amounts of oxidizing agent and can be added in a diluted form. Degrading and nondegrading oxidations are disclosed in U.S. Pat. Nos. 2,806,860; 2,982,728; 3,316,177; 3,153,025; 3,365,499; and 3,544,520. It is important to adjust reaction conditions using the oxidizing agent so that the organic compounds remain undegraded and are not consumed by the oxidizing agent. In this way the oxidizing agent can react with the olefinic groups present in the olefinic substituted dicarboxylic acid introducing oxygen containing polar functional groups and other molecular changes without substantial degradation.

The oxidation can be controlled to prevent degradation by continually measuring the molecular weight of the oxidation product. Of the many conventional analytical procedures used for molecular weight measurements, viscosity measurement is the most rapid means to measure molecular weight and hence degradation. A viscosity decrease indicates molecular weight decrease and compound degradation. The oxidation conditions are controlled so that the viscosity of the oxidation reaction does not substantially decrease. A small increase in viscosity which often occurs during oxidation appears to be caused by the added polar groups.

The preferred oxidizing agent is an oxygen containing gas such as air. Stronger oxidants are more difficult to control. Other oxidant produce sulfur, nitrogen etc. containing compounds which can be deleterious to the oxidized product properties in some instances. These oxidants produce useable compositions, but the compositions are somewhat less effective.

Oxidations of the olefinic substituted dicarboxylic acids by oxygen-containing gases can be carried out at a temperature of about 60° C. to 600° C. depending on the oxygen concentration and flow rate. Preferably, with air oxidation flow rates of 1–100 standard cubic feet per hour (SCFH) per mole of olefinic substituted dicarboxylic acid compound the oxidation is carried out at a temperature of about 60° to 300° C. with no substantial degradation.

The oxidation process apparently produces a variety of products. Epoxides, vicinal hydroxyls, dienes, carbonyls, unsaturated carbonyls (carbonyls with an unsaturation alpha to the carbonyl), hydroxyls, hydroperoxides, carboxyls, etc. The olefinic content of the compound is therefore reduced, but not completely eliminated. Commonly, the unsaturation value measured by titration of meta chlorobenzoic acid formed by the reaction of the olefinic bond and meta chloro-perbenzoic acid and the alkenyl succinic anhydride will measure about 60 (wt.)% before oxidation and about 45 to 50

(wt.)% after oxidation indicating the oxidation derivatives and saturates a portion of the olefinic bonds.

The olefinic substituted dicarboxylic acid can be oxidized neat or preferably in a solution. Examples of useful solvents are polyalkenes, aliphatic solvents such as hexane, heptane, pentane, lingroin, petroleum ether, etc., aromatic solvents such as benzene, toluene, xylene, and $C_9+$ aromatic streams. Commonly the reaction between the olefinic compound and the unsaturated dicarboxylic acid compound is conveniently conducted in an excess of the olefinic compound, such as a polyalkene, as a solvent. The advantage of this is that after the reaction of the olefinic compound and the unsaturated dicarboxylic acid compound the product can be oxidized in the olefinic compound solvent without separation of the olefinic substituted dicarboxylic acid compound. The olefinic compound solvent can remain in the product and need not be removed, thereby eliminating the need for a process step. Substantially all the oxidation occurs on the unsaturated portion of the olefinic substituted dicarboxylic acid compound, to the exclusion of the solvent. Preferably to maintain short oxidation times and complete oxidation of the olefinic saturated dicarboxylic acid compound, these olefinic solvents should have a viscosity of less than 1,000 Saybolt Universal Seconds (SUS) at 100° C. in order to allow adequate gas mixing and gas diffusion during the oxidation.

The air oxidations can be carried out at reduced, ambient, or elevated pressures in well-stirred glass, stainless steel or other oxidation resistant vessels. Reaction temperatures from about 60° C. to about 600° C. can be used. At temperatures used for the oxidation the reaction can be carried out from about 1 to about 48 hours. Preferably with mild conditions 24 hour oxidation time is sufficient for complete oxidation.

There are many catalysts disclosed in the art for oxidation reactions. These conventional oxidation catalysts can be used to oxidize the compounds in this invention, but the catalysts may remain in the product and produce undesirable effects preferably the reaction is uncatalyzed.

The reaction between the polyamine and the olefinic substituted dicarboxylic acid compound can be carried out in much the same way as conventional reactions are conducted between a polyamine and polyalkenyl succinic acid anhydride. About 0.1 to about 10 moles of polyamine is reacted per mole of the oxidized olefinic substituted dicarboxylic acid compound to produce the novel gasoline detergent. The reaction can be carried out at a temperature from about 60° C. to about 300° C. in the various process solvents discussed above and is ready for use after stripping water of reaction.

The nature of the reaction of the olefinic compound and the unsaturated dicarboxylic acid compound requires the existence of at least one unsaturated bond in both the olefinic compound and the unsaturated dicarboxylic acid compound. Thus, the oxidation of the olefinic compound prior to the reaction with the unsaturated acid compound commonly alters the unsaturation content in both reactants and alters the nature of the reaction product of the olefin and the unsaturated acid compound creating a much broader range of molecular weight in reaction products. The reaction products of the olefinic substituted dicarboxylic acid compound and the polyamine can also be oxidized. However, the properties of the gasoline additive produced in this way are reduced apparently by oxidation of the amine residues in the polyamine substituent.

The additive can be blended in gasoline at an amount from about 0.1 to about 1000 pounds per thousand barrels or 0.38 to 3,800 parts per million based on the gasoline. The invention also contemplates the use of various other gasoline additives used in common with gasoline detergents. Such other additives are octane number increasing additives, anti-icing additives, biocides, anti-rusts, demulsifing additives, etc.

The following examples are illustrative and should not be construed as limiting the scope of the invention.

EXAMPLE I

Into a 2 liter Pyrex resin kettle equipped with a condenser, mechanical stirrer, thermometer, air inlet tube (a straight glass tube of about 3/16 inch inside diameter extending close to the bottom of the kettle), an electric mantle and a nitrogen inlet tube fitted at the top of the condenser, was added 1134 grams of the 60% active polybutenyl succinic anhydride of Example VII. The inactive portion of the material added was polybutene, molecular weight about 430. The viscosity of the starting material was 336 SUS at 100° C. The contents of the kettle were stirred and heated to a temperature of 105° C. Nitrogen gas was blown through the condenser gas inlet tube at 2 SCFH. Air was blown through the air inlet tube at 7 SCFH. The oxidation reaction was carried out under these conditions for 24 hours. The oxidized polybutenyl succinic anhydride solution thus obtained weighed 1111 grams indicating a weight loss of 23 grams (2 percent). The weight loss is attributed to volatile components in the starting material. The activity of the product was 68.5%, an increase of 1.5% attributed to a small amount of oxidation of the polyalkene solvent. Product viscosity was 448 SSU at 100° C., an increase of 112 SSU. An infrared spectrum of the product displayed carbonyl absorptions at 1870 (weak), 1790 (strong), and 1710 (medium). Relative intensities of the first and last bands were thus reversed with respect to starting material.

EXAMPLE II

Example I was repeated except with the polybutenyl succinic anhydride of Example VIII was used in place of the anhydride for Example VII.

EXAMPLE III

Into a 500 ml 3 neck flask equipped with a heater, nitrogen atmosphere, stirrer, reflux condenser and air inlet tube directed below the surface was placed 134 grams (0.17 mole) of a 65% by weight solution of polybutenyl succinic anhydride in polybutene having an oxygen content of 6.8 (wt.)%. The mixture was heated to 115° C. with stirring and air was introduced through the air inlet tube through the liquid at 1 cubic foot per hour. The reaction was carried out for 24 hours at 105° C. The product had 8.5 (wt.)% oxygen representing an increase of about 0.775 equivalents of oxygen per mole of olefinic substituted dicarboxylic acid compound when the reaction was concluded.

EXAMPLE IV

Into a 2 liter Pyrex resin kettle heated by an electric mantle equipped with a mechanical stirrer, a condenser, a Dean-Stark trap, a thermometer, a gas inlet tube which is a straight, 3/16" inside diameter glass tube extending near the bottom of the vessel, and an addition funnel was weighed 400 grams of the oxidized polybutenyl succinic anhydride of Example I and 113.8 grams of diethylene triamine (0.53 moles). Into the addition funnel was added an additional 400 grams of the oxidized polybutenyl succinic anhydride. The contents of the kettle were stirred and maintained at a temperature of 155° C. under a nitrogen gas blanket. The oxidized anhydride in the addition funnel was added slowly to the kettle over about 30 minutes and the reaction mixture was continued for an additional 30 minutes while the temperature was maintained at 155° C. At the end of this period, the temperature was raised to 170° C. and water of reaction was stripped by the nitrogen gas flow for 2 hours. The product had an activity of 71.5% and a viscosity of 3039 SSU at 100° C. The infrared spectrum of the product had absorptions at 3280, 1770, 1705, 1700 and 1670 cm$^{-1}$.

EXAMPLE V

Into a 250 ml/3-neck flask heated by an electric mantle equipped with a stirrer, condenser, and Dean-Stark trap, thermometer, gas inlet tube, and an addition funnel, was added 16.0 grams of diethylenetriamine (0.148 moles). Into the addition funnel was added 100 grams of the oxidized polybutenyl succinic anhydride of Example II. The contents of the flask was heated with stirring to a temperature of 140° C. The oxidized polybutenyl succinic anhydride in the addition funnel was added over a period of 30 minutes from the addition funnel at that temperature. At the end of the addition, the temperature was raised to 200° C. and solvent and water of reaction were removed with a nitrogen stream through the Dean-Stark trap.

EXAMPLE VI

Example IV was repeated with twice the amount of oxidized polybutenyl succinic anhydride.

EXAMPLE VII

Into a 5 liter/3 neck Pyrex flask equipped with a condenser, addition funnel, thermometer, gas inlet tube, mechanical stirrer, and heating mantle was weighed 2200 grams of polybutene having a molecular weight of about 432 and an unsaturation content of 99.6. Into the addition funnel was placed 3.3 grams of paratoluene sulfonic acid dissolved in 6.6 grams of acetic anhydride and 450.5 grams of maleic anhydride (4.24 moles) which was melted and kept in a liquid state with heat lamps. The polymer in the flask is stirred and heated to a temperature of about 215° C. under a nitrogen atmosphere. The melted maleic anhydride catalyst mixture was added dropwise to the stirred polymer at a rate such that the reaction mixture temperature could be maintained between 210° to 215° C. without flooding the condenser. The addition under these conditions required 4 hours. During the addition, two drops of antifoam fluid was added to reduce foaming. After the addition of the maleic anhydride the reaction mixture was maintained at 215° C. for 21 hours. The reaction mixture at the end of this period was increased to 235° C. The condenser was replaced with a distillation head and air cooled condenser. The nitrogen flow through the gas inlet tube was increased to 4 SCFH and the unreacted maleic anhydride was thus stripped from the reaction mixture for 2 hours. The mixture was cooled and filtered. The product polybutenyl succinic anhydride obtained had an activity of 67%, the balance of the material being unreacted polybutene with a viscosity of 336 SUS at 100° C. The infrared spectrum displayed carbonyl absorptions at 1870 (medium), 1790 (strong), and 1710 (weak).

EXAMPLE VIII

Example VII was repeated except that a polybutene having a molecular weight about 330 was used in place of the polybutene having a molecular weight of about 430.

EXAMPLE IX

Example VII was repeated except that a polybutene having a molecular weight about 1,228 was used in place of the polybutene having a molecular weight of about 430.

EXAMPLE X

Example IV was repeated except using the unoxidized product of Example VII.

EXAMPLE XI

Example V was repeated except using the unoxidized product of Example VIII.

The performance of products of the examples have been evaluated by the CRC (Coordinating Research Council) carburetor detergency test procedure. Briefly, the additive is blended with 35 gallons of fuel which is consumed in a 20 hour test by a six-cylinder Ford engine. During the 20 hour test, the engine is cycled between idle speeds and medium cruise speed. A controlled amount of engine "blow-by" is induced by enlarging the gaps of the compression piston rings. This "blow-by" is passed into the top of the carburetor. Also, "EGR" (Engine Gas Recirculation) is applied during cruise operations. Performance of the gasoline detergent is judged by the amount of deposits formed on a removable throttle body sleeve. The insert sleeve in the engine carburetor is rated after the test in accordance with deposit weight and deposit appearance. Test results are:

TABLE I

| Product of Example in gasoline | Conc. lb. per thousand bbls. | Deposit Wt. (mgs) | Visual Rating (10 = Clean) |
|---|---|---|---|
| IV (oxidized) | 10.0 | 1.1 | 8.6 |
| V (oxidized) | 10.0 | 2.4 | 7.8 |
| VI (oxidized) | 10.0 | 3.0 | 8.3 |
| IX (oxidized) | 5.0 | 4.7 | 6.8 |
| IX (oxidized) | 20.0 | 2.4 | 8.4 |
| IX (oxidized) | 50.0 | 1.5 | 8.7 |
| X (unoxidized) | 10.0 | 3.6 | 8.1 |
| XI (unoxidized) | 10.0 | 7.2 | 7.2 |
| Base fuel (blank) | — | 13.3 | 6.7 |
| Base fuel (blank) | — | 11.7 | 6.3 |

An examination of Table I shows that the diethylene triamine derivatives of the oxidized polyalkenyl succinic anhydride are superior in carburetor detergency to either the unoxidized product or the base fuel containing no additives.

Rust Inhibition

Rust inhibition is measured by the ASTM D-665-60 Turbine Oil Rust test. A carbon steel coupon is immersed in a beaker of 300 ml of fuel and an amount of the test additive. The temperature of the beaker and contents is controlled at 27° C., and 30 ml of water is added to the beaker. After 20 hours of contact with stirring, the coupons are rated by observation of the percent of surface rust.

TABLE II

| RUST TEST INDOLENE FUEL | | |
|---|---|---|
| ADDITIVE FROM EXAMPLE | CONC PPM | % RUST |
| IX | 19 | 40 |
| IV | 19 | 15 |
| IV | 38 | 2 |
| V | 38 | 8 |
| BLANK (NO ADDITIVES) | — | 95 |

An examination of Table II reveals increased rust inhibition of the oxidized succinimide (IV and V) over the unoxidized product (IX).

I claim:

1. A composition comprising the polyamine derivative of an oxidized substantially undegraded adduct of an olefinic compound and an unsaturated dicarboxylic acid compound having 4 to 10 carbon atoms containing two carboxyl functions either free or in an anhydride form and at least one unsaturated olefinic bond.

2. The composition of claim 1 wherein the oxidized substantially undegraded adduct is prepared at conditions such that substantial degradation in molecular weight does not occur.

3. The composition of claim 2 wherein the adduct is a compound having a molecular weight from 250 to 6000 selected from the group consisting of alkenyl succinic acid and alkenyl succinic anhydride, and the polyamine is ethylene diamine.

4. A process which comprises contacting an oxidizing agent with an adduct of an olefinic compound and an unsaturated dicarboxylic acid compound having 4 to 10 carbon atoms containing two carboxyl functions either free or in an anhydride form and at least one unsaturated olefinic bond to produce a substantially undegraded oxidized adduct, and reacting the oxidized adduct with about 0.1 to 10.0 moles of a polyamine per mole of the oxidized adduct.

5. The process of claim 4 wherein the oxidizing agent is an oxygen containing gas.

6. The process of claim 5 wherein the oxygen containing gas is contacted with the adduct at the rate of about 1 to 100 SCFH at a temperature of about 60° C. to 300° C.

7. The process of claim 4 wherein the adduct is selected from the group consisting of an olefinic substituted succinic acid and an olefinic substituted succinic anhydride.

8. The process of claim 4 wherein the adduct is a polyalkenyl dicarboxylic acid compound.

9. The process of claim 8 wherein the polyalkenyl dicarboxylic acid compound is polyisobutenyl succinic anhydride.

10. The process of claim 4 wherein the polyamine is ethylene diamine.

11. A process which comprises contacting about 1 to 100 SCFH of an oxygen containing gas at 60° C. to 300° C. per mole of a compound selected from the group consisting of alkenyl succinic acid and alkenyl succinic anhydride and mixtures thereof, to produce an oxidized substantially undergraded alkenyl succinic compound, and reacting 0.1 to 10.0 moles of a polyamine per mole of the oxidized alkenyl succinic compound.

12. The process of claim 11 wherein the polyamine is ethylene diamine.

13. A gasoline comprising an effective amount of the composition of claim 1 or the product of claim 4 or claim 11.

14. The product of the process of claim 4 or claim 11.

15. The composition of claim 1 wherein the unsaturated dicarboxylic acid is selected from the group consisting of maleic acid, maleic anhydride, itaconic acid, itaconic anhydride, citraconic acid, and citraconic anhydride.

16. The process of claim 4 wherein the unsaturated dicarboxylic acid is selected from the group consisting of maleic acid, maleic anhydride, itaconic acid, itaconic anhydride, citriconic acid, and citriconic anhydride.

* * * * *